United States Patent [19]

Gondek

[11] 4,135,897
[45] Jan. 23, 1979

[54] AIR CLEANER

[76] Inventor: John T. Gondek, P.O. Box 21013, Minneapolis, Minn. 55421

[21] Appl. No.: 846,727

[22] Filed: Oct. 31, 1977

Related U.S. Application Data

[63] Continuation-in-part of Ser. No. 686,148, May 13, 1976, abandoned.

[51] Int. Cl.² .................................................. B01D 45/12
[52] U.S. Cl. ........................................ 55/404; 55/418; 55/429; 55/DIG. 28
[58] Field of Search .................................. 55/391–400, 55/403–409, 417, 418, 420, 424, 426, 429, 435, 436, 447, 448, 449, 451, 454, 456, 457, DIG. 28, 319; 415/110, 111, 170 A; 417/354

[56] References Cited

U.S. PATENT DOCUMENTS

| | | | |
|---|---|---|---|
| 1,170,438 | 2/1916 | Fahrney | 55/429 |
| 1,438,553 | 12/1922 | Quam | 55/391 |
| 1,530,825 | 3/1925 | Grimes | 55/DIG. 28 |
| 1,743,521 | 1/1930 | Bull | 55/420 |
| 1,871,384 | 8/1932 | Miller | 55/394 |
| 2,244,372 | 6/1941 | Pomeroy | 55/418 |
| 2,393,112 | 1/1946 | Lincoln | 55/418 |
| 2,448,048 | 8/1948 | Porter | 55/404 |
| 2,750,894 | 6/1956 | Thomas et al. | 415/111 |
| 2,936,844 | 5/1960 | Gill | 55/454 |
| 3,137,552 | 6/1964 | Weinand | 55/418 |
| 3,158,142 | 11/1964 | Bradshaw | 55/417 |
| 3,670,480 | 6/1972 | Peterson | 55/457 |
| 3,973,937 | 8/1976 | Peterson | 55/404 |

FOREIGN PATENT DOCUMENTS

| | | | |
|---|---|---|---|
| 391765 | 6/1908 | France | 55/404 |
| 656550 | 5/1929 | France | 55/420 |
| 127029 | 10/1928 | Switzerland | 55/420 |

*Primary Examiner*—Frank W. Lutter
*Assistant Examiner*—David L. Lacey
*Attorney, Agent, or Firm*—Peterson, Palmatier, Sturm & Sjoquist, Ltd.

[57] ABSTRACT

An air cleaner is provided having an inlet and a concentric outlet passage. Means is provided for imparting a whirling motion to the air as the air enters the inlet. Provision is made for varying the size of the inlet so that the velocity of the air may be adjusted for different engine speeds. Turbine vanes are driven by the whirling air and drive blower vanes which assist centrifugal force in directing dust particles toward a particle outlet in the chamber wall.

9 Claims, 18 Drawing Figures

AIR CLEANER

CROSS-REFERENCE TO RELATED APPLICATION

This is a continuation-in-part of my application, Ser. No. 686,148, filed May 13, 1976 now abandoned.

BACKGROUND OF THE INVENTION

Numerous forms of air cleaners have been produced for separating larger particles of dust and the like from incoming air. For example, the U.S. Pat. No. 1,934,311 granted Nov. 17, 1933 to Cegerreis et al refers to air entering the outer housing of the air cleaner which is given a swirling motion by a series of fixed angular vanes through which the air is drawn from the outer atmosphere. The air leaving the air cleaner passes through a central opening which is concentric with the outer housing. As the air passes through the inlet, it is increased in speed by a funnel-shaped deflector which gradually increases the air velocity in a direction parallel to the axis of the inlet. At the point where the air reverses direction to flow through the outlet, the air comes into contact with a series of angularly spaced defuser blades which tend to stop the swirling movement of the air. As a result, the larger particles of dust and other impurities continue their movement in an axial direction and flow into a dust pocket where these larger particles are trapped.

U.S. Pat. No. 1,734,030 issued Nov. 5, 1929 to Bennett shows a somewhat similar arrangement in which the air is directed in a swirling movement by passing through fixed louvers or vanes in the inlet of the air cleaner. The outlet passage, which is concentric with the inlet, is formed by the flaring shape of the outlet so that the velocity of the air reaches its peak as the air passes the large diameter extremity of the outlet. The extremity of the outlet is provided with upwardly and outwardly inclined vanes which tend to break up the swirling movement of the air at the point where the velocity is at its peak. Accordingly, where the air changes its direction to flow through the outlet, the entrained heavier particles of dust and other impurities continue their generally axial movement and are collected in a dust collecting chamber.

U.S. Pat. No. 3,670,480 issued July 20, 1972 to Petersen also shows an air cleaner having a tubular outlet or discharge passage encircled by a concentric inlet. The incoming air is directed in a spiral passage by angularly spaced vanes which act to rotate a spinner mounted co-axially within the chamber. The spinner is designed to increase the normal tendency of the swirling air to flow outwardly toward the peripheral outer wall of the housing. As a result, solid particles of dust and the like which are entrained in the moving air are directed through an outlet passage in the outer wall of the housing. U.S. Pat. No. 3,973,937 issued Aug. 10, 1976 to Petersen makes use of a paddle-type impeller instead of a spinner. In neither of the Petersen patents is provision made for adjusting the velocity of air flow with changes in engine speed.

SUMMARY OF THE INVENTION

The present invention resides in the provision of an air cleaner which also includes an outer housing having an inlet through which air may flow, the air being directed in a swirling movement by vanes supported at the inlet. This swirling movement tends to produce a centrifugal force within the outer wall of the housing. A series of rotatable vanes are rotatably supported for movement about the axis of the housing, rotation of these vanes tending to increase the effect of centrifugal force. Thus, as the air moves through the outer housing from the inlet, heavier particles of dust and the like are thrown outwardly by the effect of centrifugal force to pass through a dust discharge which tends to separate these particles from the air.

The rotatable blades within the housing are supported by a suitable bearing supported by the outlet passage of the air cleaner. As a result, by removing the cover portion of the housing, the entire interior of the air cleaner is accessible. This permits a cap to be removed from the bearing housing enclosing the bearings supporting the rotatable blades, permitting lubrication of the enclosed bearing from time to time.

A feature of the present invention resides in the provision of an air cleaner of the type described which includes angularly spaced vanes in the inlet portion of the housing. The adjustment of these vanes may be varied according to the result which is to be produced. For example, the vanes may be pre-set at a desired angle to provide a desired angular relation between the vanes. With this arrangement, the vanes may be pre-set to the proper opening where the internal combustion engine is controlled by a governor and is designed to operate at a desired speed of rotation. If desired, the vanes may be spring urged toward closed position, and the opening of the vanes may vary according to the speed of actuation of the engine. Thus, the air cleaner may be adjusted to compensate for the type of engine on which the air cleaner is to be used.

An important feature of the present invention resides in the provision of an air cleaner of the type described in which the inlet of the air cleaner may be varied to suit various engine speeds. Means is provided for varying the size of the inlet so that the velocity of the air may be increased when the engine is traveling at low speeds or idling speeds. When the engine is traveling at low speeds, the turbine effect accomplished by the rotating vanes may not be sufficient to separate the dust particles from the air. Means may be provided for limiting the size of the inlet opening when the engine is traveling at a slow speed. By limiting the size of the inlet, the velocity of air passing through the input is correspondingly adjusted to the appropriate velocity. As a result, the velocity of the incoming air may be increased when the engine is traveling at slow speed, thereby serving to effectively clean the air even though the speed of the engine is relatively slow.

A feature of the present invention resides in the provision of an inlet to the air cleaner which may be varied in size independently of the vanes. The inlet may be provided with a device such as a floating plate which will partially block the flow through the inlet, when the engine is traveling at slow speed, thus increasing the velocity of the incoming air as it is directed toward the vanes. As the flow of fluid entering the inlet increases, as when the speed of the engine increases, the floating plate will move farther out of the path of air entering the inlet, thereby increasing the size of the inlet to compensate for this increased flow of air. This floating plate may be held from movement when the air cleaner is used with a constant speed engine. The floating plate may comprise a weighted ring-shaped plate mounted upon a flexible support, or may comprise a plate of this type mounted on a flexible or resilient bellows. Further, if so desired, the inlet adjustment may be provided by making the vanes themselves of flexible material such as plastic or thin metal so as to automatically flex toward open position upon an increase in air entering the air cleaner.

A further feature of the present invention resides in the provision of a pair of turbine blades secured to the outer surface of the rotatable outer portion of the bearing to rotate in unison therewith. As the air passes through the air cleaner, the air moves relatively slowly due to the dimensions of the inlet passage outwardly of the discharge passage. As the air changes direction to pass through the outlet passage, the speed of swirling air is increased due to the fact that the discharge passage is of smaller diameter. Accordingly, the speed of travel of the air within the discharge passage increases, striking the turbine blades which are secured for rotation with the blower blades, increasing the speed of the blower blades. This increases the blowing action of the blower blades, and increases the tendency for the larger particles of dust and the like to be forced through the particle outlet.

DESCRIPTION OF THE PREFERRED EMBODIMENTS

While the principle of operation of the various forms of this invention function in a substantially similar manner, various modifications of construction have been disclosed.

The applicant's air cleaner is primarily produced for manufacturers of heavy machinery which may be in the nature of earth moving equipment, road building machinery, and the like. In view of the fact that the air cleaner is produced for various manufacturers, the structure is such that it may differ in form and appearance, so that the air cleaners produced for one company will not appear similar to air cleaners sold by other manufacturers, even though the resulting action is very similar.

It should also be explained that cleaners of the present design will function effectively whether they are mounted on a vertical axis, an axis which is inclined to the vertical, or an axis which is horizontal. In the present drawings, the air cleaner is shown as mounted on inlet pipes which are horizontal. However, in the particular arrangements illustrated in FIGS. 1, 5 and 6, the axis of the cleaner should be vertical so that gravity will pull the weighted vanes to the closed position.

Figure 1:
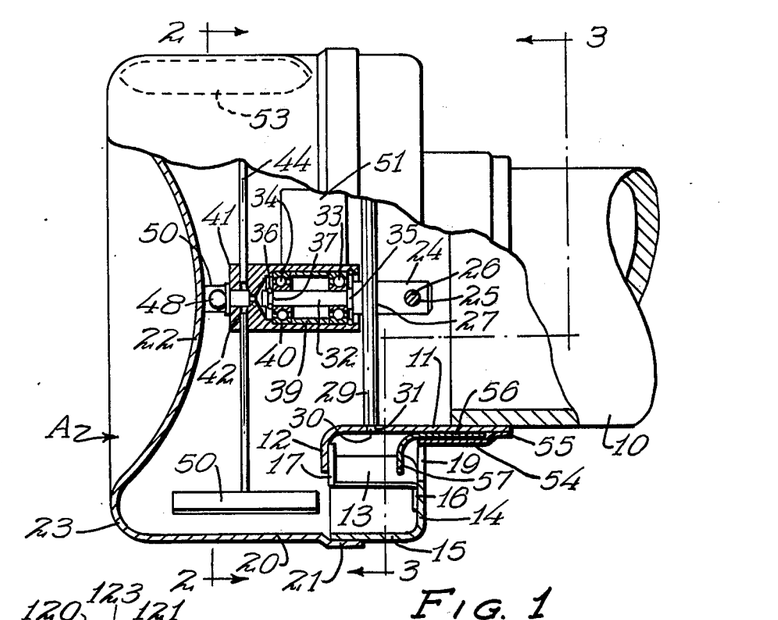
FIG. 1 is an elevational view of the air cleaner, a portion of the cleaner being broken away to show the interior thereof.
Figure 2:
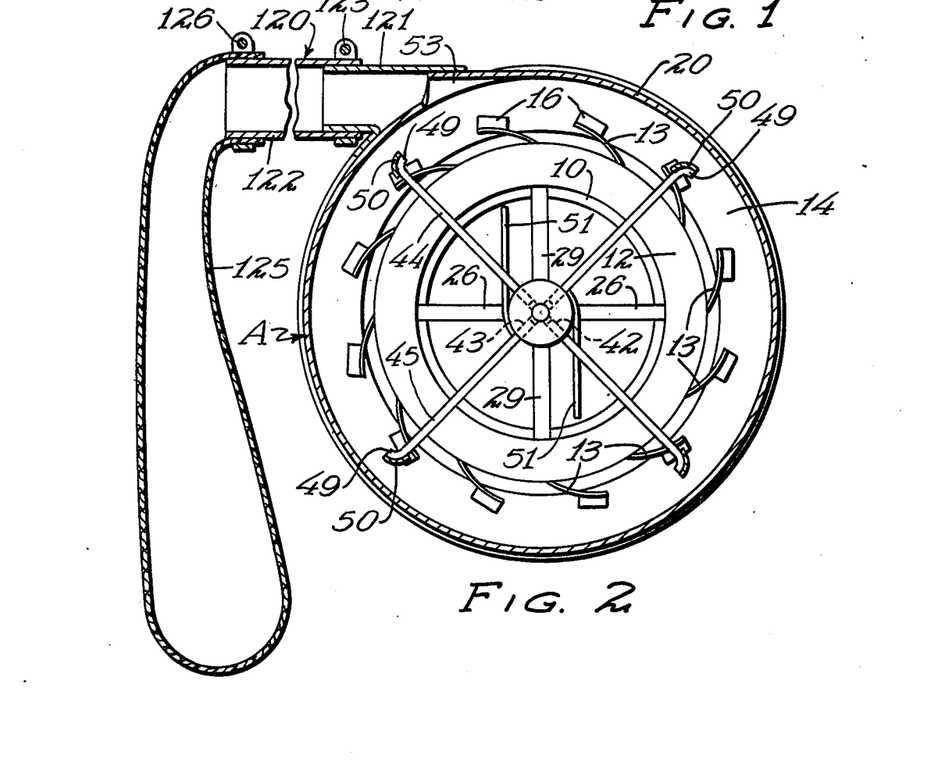
FIG. 2 is a sectional view through the air cleaner on a plane normal to the axis thereof, the position of the section being indicated by the line 2—2 of FIG. 1.
Figure 3:
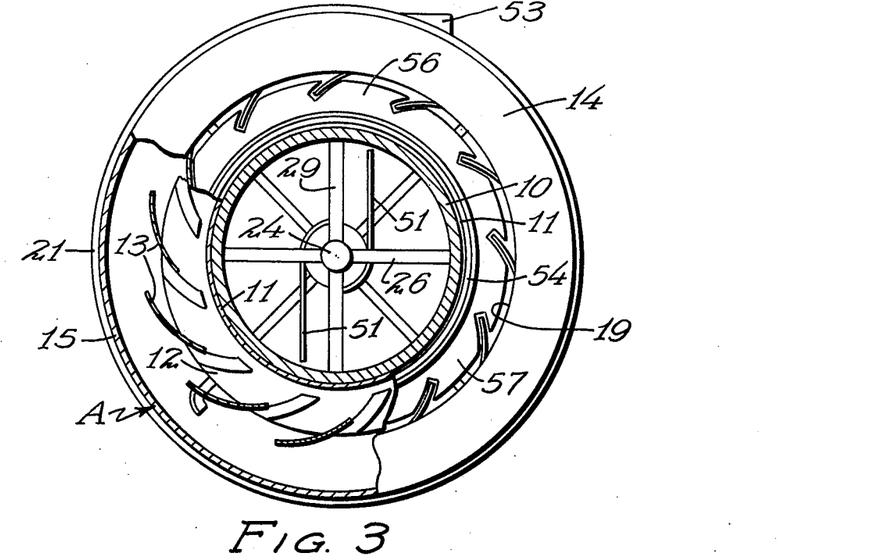
FIG. 3 is a sectional view through the air cleaner, the position of the section being indicated by the line 3—3 of FIG. 1.

One form of construction is illustrated in general by the numerals 1 to 3 of the drawings. All of these cleaners are designed for mounting on an air inlet pipe 10. The air cleaner A includes an inner mounting sleeve 11 which is designed to frictionally fit upon the pipe 10 and is provided with an out-turned flange 12 at its outer or upper extremity. The sleeve 11 functions as a discharge or outlet sleeve, as will become clearer as the description progresses. Curved vanes 13 connect the flange 12 with an in-turned flange 14 of an outer housing portion 15 which includes a cylindrical sleeve. As indicated in FIG. 2 of the drawings, the outwardly turned ears 16 of the vanes 13 are spot welded or otherwise secured to the in-turned flange 14.

As indicated in FIGS. 1 and 3 of the drawings, the other ends of the vanes 13 are secured to the flange 12 by angularly turned ears 17 which are spot welded or otherwise secured to the out-turned flange 12. The ring-shaped area 19 between the inner end of the flange 14 and the sleeve 11 forms the inlet of the air cleaner.

The outer housing of the air cleaner includes a cylindrical sleeve 20 having a ring-shaped outwardly offset edge 21 which overlaps the cylindrical wall 15 and forms an extension thereof. The closed end 22 of the air cleaner is connected to the sleeve 20 along a reversely turned connecting area 23. This inwardly extending dome-shaped portion 22 is desirable in that it assists in reversely turning the flow of the air within the air cleaner. However, it may, if desired, be otherwise shaped in the event it is necessary to change the outward shape and appearance of the air cleaner body.

A bearing supporting post 24 is apertured as indicated at 25 through the axis of the post to support a supporting rod 26. The post 24 is drilled through, and at right angles to, the axis to the post as indicated at 27. The bore of the aperture 27 is at right angles to the aperture 25. A supporting rod 29 extends through the aperture 27, to assist in supporting the post 24.

As indicated in the drawings, the rods 26 and 29 are produced with end portions 30 of reduced diameter which fit through apertures 31 in the outlet sleeve 11. In view of the fact that the rods 26 and 29 are at right angles to one another, the bearing supporting post 24 is supported coaxially with the outlet sleeve 11.

The end of the post 24 which is most remote from the air inlet pipe 10 is reduced in diameter as indicated at 32 to support the inner races of axially spaced ball bearings 33 and 34. The inner race of the bearing 33 is held in place by a shoulder 35 and the inner race of the other bearing 34 is held in place by a sealing ring or retaining ring 36 which is mounted in a groove 37 near the end of the post portion 32. The bearings 33 and 34 are held in spaced relation by a spacing sleeve 39 which is between the outer races of the bearings. The bearings 33 and 34 extend in the axial bore 40 of the cylindrical blower blade support 41. The solid outer end of the blade support 41 is drilled transversely of its axis to provide right angular bores 42 and 43 which accommodate blower blade arms 44 and 45. The outer ends of the arms 44 and 45 are bent angularly in opposite directions as indicated at 49 to accommodate blower blades 50 which are elongated in a direction parallel to the axis of the air cleaner. The blower blades 50 are shaped to assist in directing the incoming air outwardly toward the inner surface of the sleeve 20. Because of the bent outer ends of the arms 44 and 45, these arms are usually made in two pieces which terminate in end abutting relation.

As indicated in the drawings, turbine blades 51 extend in parallel direction tangentially from opposite sides of the blower arm support 41. These blades 51 are engaged by the swirling action of the air passing through the discharge of the air cleaner. As indicated in FIG. 2, the outer housing sleeve 20 is provided with a particle discharge 53 through which the heavy dust particles, together with some of the air, may be discharged from the air cleaner.

A means is provided for regulating the velocity of the air entering the air cleaner. With reference to FIG. 1 of the drawings, a sleeve 54 encircles the discharge or outlet sleeve 11 and includes an offset end 55 which is secured to the sleeve 11. A deflector 56 is slideably supported between the inner sleeve 11 and the outer sleeve 54. The deflector 56 is provided with an angularly extending end 57 which is designed to deflect the air passing through the vanes 13. By adjusting the position of the deflector 56, the velocity of the air entering the air cleaner may be regulated.

Figure 4:
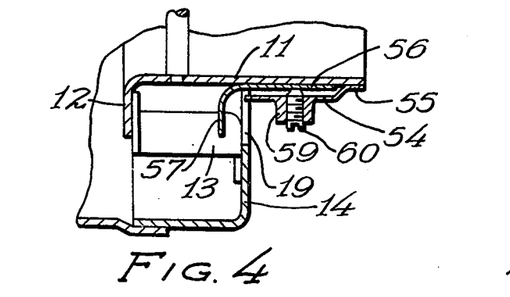
FIG. 4 is an enlarged sectional detail showing an air deflector mounted across the inlet passage of the air cleaner, the deflector being of the type which may be preset for use in conjunction with constant speed engines.

With reference to FIG. 4 of the drawings, the deflector 56 may be secured in an adjusted position. A series of angularly spaced bosses 59, one of which is shown in FIG. 4 are secured to the outer surface of the sleeve 54, and a set screw 60 is threaded through each boss 59 and against the portion of the deflector 56 which is enclosed within the sleeve 54, the deflector 56 being urged against the sleeve 11. This type of pre-setting is desirable where the air entering the air cleaner is for use in a constant speed engine. The position of the deflector may be set for the proper operation of the constant speed of the engine when operating at its proper speed, and need not be regulated later.

Figure 5:
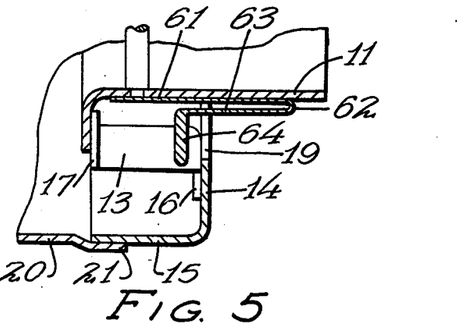
FIG. 5 is a sectional detail similar to that shown in FIG. 4, but showing a form of weighted deflector which may be used in place of the deflector shown in FIG. 4.

FIG. 5 of the drawings shows a modified form of means for adjusting the size of the inlet opening. This device is formed of readily flexible resilient plastic. A sleeve 61 of resilient plastic is reversely bent as indicated at 62 to support an outer sleeve 63 which in turn supports a ring-shaped weighted deflector 64 in spaced relation to the inlet opening 19. When the engine supporting the air cleaner is traveling at idling speed, the inlet opening is relatively small, but the velocity of the incoming air is high in view of the fact that the inlet opening 19 is restricted by the deflector 64. However, as the speed of rotation of the engine increases, the position of the weighted deflector 64 changes to increase inlet opening so as to allow more air to enter the air cleaner.

Figure 6:
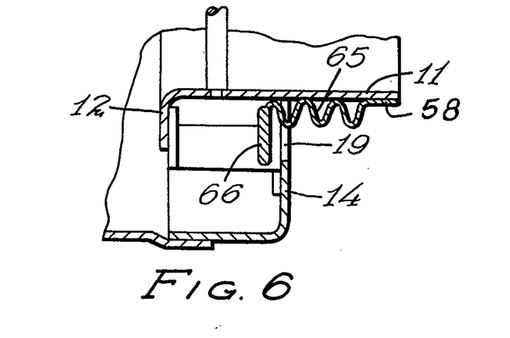
FIG. 6 is a view similar to FIGS. 4 and 5, showing another modified form of deflector.

In FIG. 6 of the drawings, another modified form of deflector is shown, the deflector being somewhat similar to that illustrated in FIG. 5. In FIG. 6, a flexible resilient bellows 65 encircles the discharge sleeve 11 and has an end 58 which is secured to the sleeve 11. The bellows supports a weighted deflector 66 which is positioned just inwardly of the inlet 19. The operation is very similar to that previously described. The weighted deflector 66 is normally in closely spaced relation to the air inlet 19, so that at low engine speeds, such as for example idling speed, the inlet is relatively small so that the air entering the air cleaner is at a relatively high velocity. This air is directed into swirling relation within the air cleaner housing, and drives the turbine blades 51 at a sufficiently high rate of speed so that the dust particles will be thrown by centrifugal force through the particle discharge opening 53.

Figure 7:
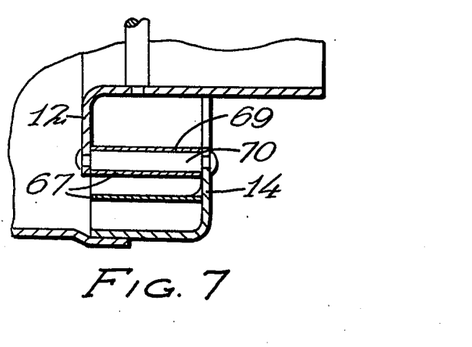
FIG. 7 is a view similar to FIGS. 4 through 6, showing the manner in which the vanes may be mounted.

FIG. 7 of the drawings is designed to disclose another means of regulating the size of the inlet opening. In this arrangement, the vanes which are similar to the vanes 13, are indicated in general by the numeral 67 and are provided with tubular anchored ends 69 mounted upon fixed pivots 70 connecting the flanges 12 and 14. The vanes 67 are secured in place with a tight enough fit so that they will remain in an adjusted relation. Accordingly, the vanes 67 may serve the double purpose of deflecting the incoming air to cause a swirling motion within the air cleaner housing, and may also be adjusted to provide an inlet of desired dimensions. The vanes 67 may be mounted in three different ways. The vanes 67 may be formed of metal or heavy plastic and may be relatively inflexible so that the air cleaner may be adjusted to pre-set position where the air cleaner is used with an engine which is governor operated, or which may operate at a uniform speed. Alternatively, the vanes 67 may be flexible, and may be made of thin metal or flexible plastic so that during idling speed the vanes greatly limit the incoming air, but when the air flow increases, the vanes may flex to accommodate a greater volume of air. As a third contingency, the vanes may be normally substantially closed, and may be urged toward closed position or urged toward a fixed or set position by resilient means, the vanes opening to a greater extent when more air is drawn into the engine. FIGS. 8 through 11 of the drawings show these structures.

Figures 8, 9, 11:
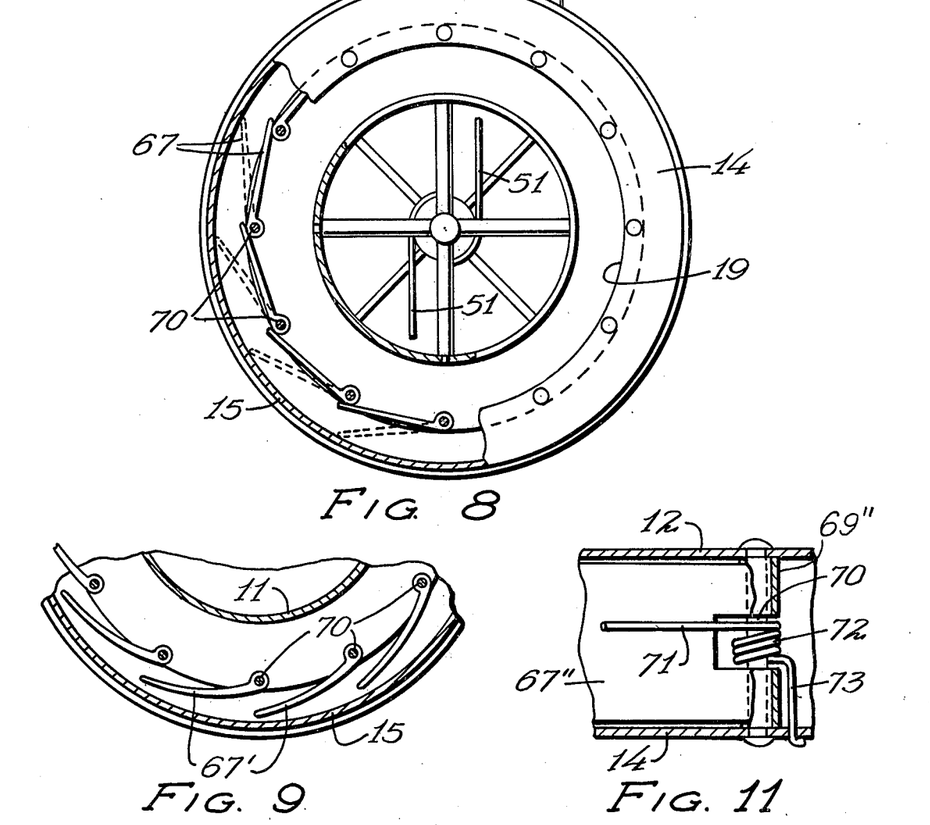
FIG. 8 is a sectional view through the air cleaner on a plane normal to the axis of the air cleaner, the section extending partially through the adjustable vanes at the inlet.
FIG. 9 is a partial section similar to FIG. 8 in showing flexible vanes in place of the rigid vanes indicated in FIG. 8.
FIG. 11 is a sectional detail showing one of the springs which may be used for urging a vane toward closed position.

FIG. 8 is a diagrammatic sectional view on a plane normal to the axis of the air cleaner showing the construction when the vanes 67 are of the rigid type. As explained above, the vanes 67 have a tubular configuration at their ends labeled 69 and owing to the sufficiently tight fit of these tubular ends 69 on the pivot pins 70, the resulting frictional engagement assures that they will remain in an adjusted position. The length of the various vanes 67, that is the distance between each tubular end 69 and the free end remote therefrom, is such that the free end of one vane 67 overlaps the tubular end 69 of the next adjacent vane 67 when the vanes are closed. The vanes 67 are shown in their substantially closed position in full lines in FIG. 8 and in their other extreme or opening position in dotted lines. In normal practice, the vanes 67 are all adjusted in a similar angular relation so that opening provided between the vanes may be regulated from a fully closed to a fully opening position, the vanes being functional when the vanes are supported between the exteme positions mentioned.

FIG. 9 of the drawings is similar to FIG. 8, but shows vanes 67' which are formed of plastic or thin metal and are resilient. Here again, the distance between their tubular ends 69' and the other or free end is sufficient so that the vanes overlap and can flex substantially closed. The vanes 67' are normally resiliently urged toward closed position. However, the vanes are permitted to flex toward open position, depending upon the flow of air entering through the vaned area.

Figure 10:
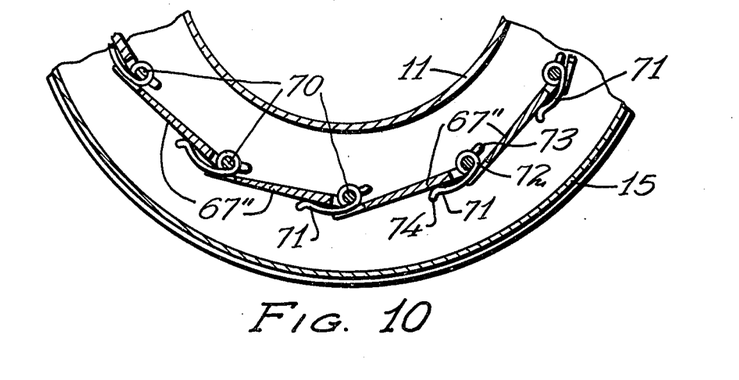
FIG. 10 is a view similar to FIG. 9, but showing vanes mounted on axes parallel to the axis of the air cleaner and which are spring mounted to provide a variable size opening depending upon the flow therethrough the air cleaner.
Figure 12:
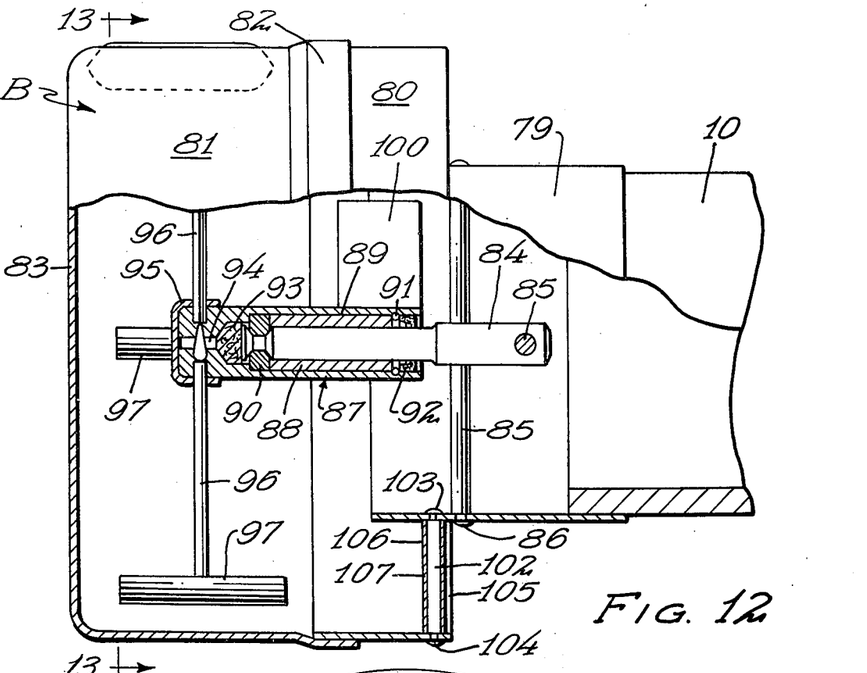
FIG. 12 is an elevational view of a modified form of air cleaner a portion of the structure being broken away to show the type of bearing which is used therein.

FIGS. 10 and 11 of the drawings shows a construction where the vanes 67" are urged toward closed position by resilient means. These figures are designed to indicate the vanes 67" mounted upon the supporting pivot 70 and urged toward closed position by springs 71. The springs 71 include the helically wound center portion 72, one end 73 of which is anchored, and the other end of which bears against the outer surface of the vane 67" as indicated at 74. As in a case of resilient vanes, the space between the vanes will vary depending upon the flow of air entering the air cleaner through the inlet opening 19. As with the vanes 67 and 67', the vanes 67" have a length such that the free ends overlap the hinged ends 69". In other words, the distance between the ends 73 and the free ends remote therefrom is sufficient to effect a substantial closing of the inlet 19. The substantial closing, of course, occurs when the suction in the outlet 11 decreases sufficiently, doing so under the influence of the resilient springs 71. Conversely, the vanes flex open to admit more air when the suction in the outlet 11 increases, the extent of their opening and thus the flow of air depending upon the amount of suction or negative pressure at that particular moment.

A modified form of construction of air cleaner is indicated in FIGS. 12 through 18 of the drawings. The air cleaner B illustrated in these figures differs from the air cleaner A mainly through the fact that the air enters the air cleaner through an inlet which is on a plane normal to the axis of the air cleaner and the air directing vanes are supported in such a normal plane rather than on a cylindrical plane concentric with the axis of rotation.

The air cleaner B is designed to fit upon the inlet pipe 10, either by friction or by other means. The air cleaner B includes an outlet sleeve 79 which is shown as cylindrical, and shaped to fit frictionally upon the inlet pipe 10. The cleaner B includes a cylindrical sleeve 80 which is of somewhat larger diameter than the sleeve 79 and is connected thereto by vanes as will be described. The body 81 includes an offset flange 82 which is friction fitted to the sleeve 80 and includes a closed end 83. The end closure 83 may be on a single plane, or may be convex as indicated at 22 in FIG. 1. The convex end such as 22 assists in some ways to guide the incoming air in a reverse direction to pass from the air inlet to the air outlet defined by the sleeve 79. As in the previous construction, the cross sectional area inwardly of the sleeve 79 is somewhat less than the cross sectional area between the sleeve 79 and the outer body sleeve 81 so that the air passing through the cleaner will travel at a greater speed as it reverses direction between the air inlet and the air outlet.

A bearing post 84 is supported by the outlet or discharge sleeve 79 in somewhat the manner previously described. Post support arms 85 similar to the arms 26 and 29 are terminally supported by the sleeve 79, this construction having the advantage of internally supporting the bearing post 84 so that the body portion 81, 83 may be removed without disconnecting the blower blades and the supporting arms. In other words, when the outer housing portion is removed from the sleeve 80, the blower blades will remain in place.

The bearing supporting post arms 85 are connected at their outer ends 86 to the sleeve 79, each arm 85 extending at right angles to the other supporting arm 85 and intersecting the bearing supporting post 84 at right angles. The post 84 suppots a bearing 88 which in turn supports the blower blade support 87. The support 87 includes an axial socket 89 which encircles the bearing 88. A thrust split bearing 90 is mounted near one end of the socket 89 and prevents the bearing 87 from axial movement in one direction. A locking ring 91 within the socket 89 prevents movement of the support 87 in the opposite direction. A seal 92 within the end of the socket 89 prevents oil from leaking through the open end of the socket 89.

An oil absorptive packing 93 is provided at the base of the socket. An oil passage 94 extends axially through the blower arm support 87 to the extremity of the blower support 87 and the packing 93 normally closes the oil passage 94.

Figure 13:
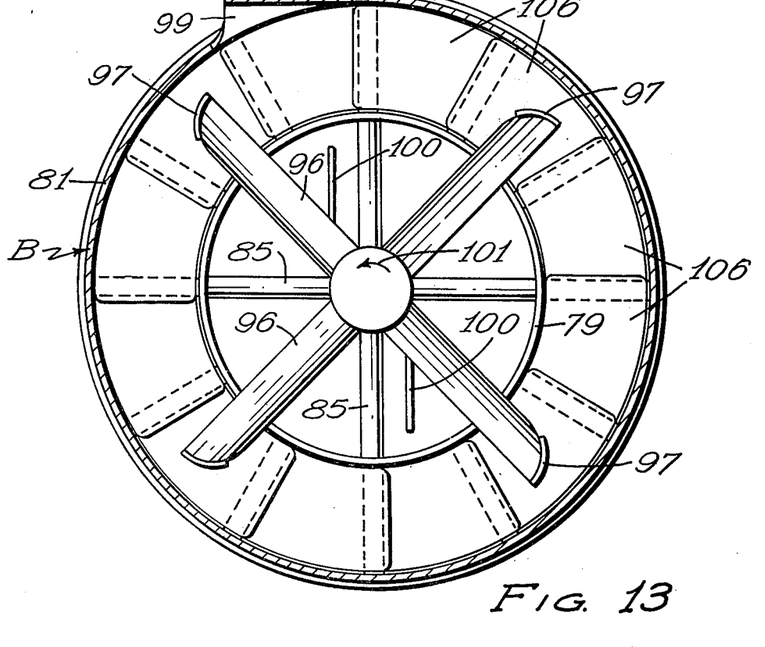
FIG. 13 is a sectional view through the air cleaner shown in FIG. 12, the position of the section being indicated by the line 13—13 of FIG. 12.
Figure 14:
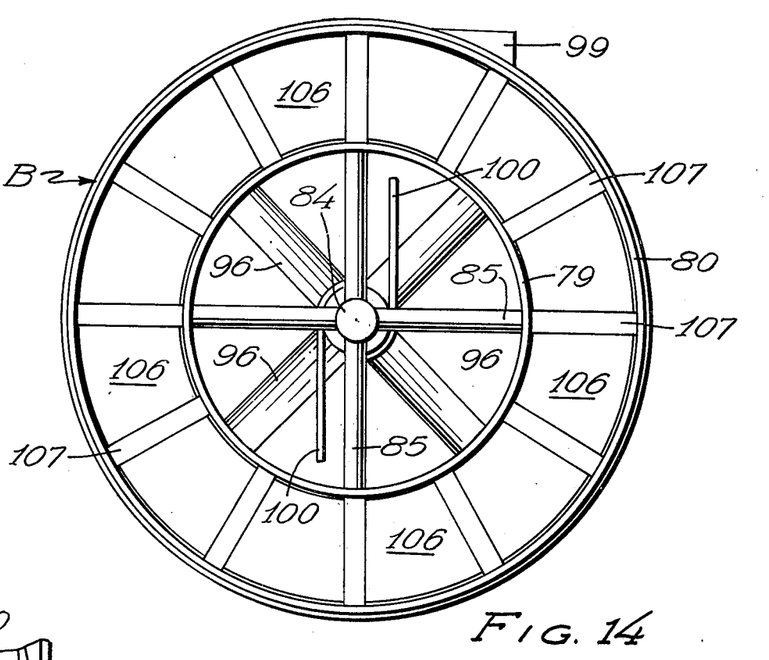
FIG. 14 is a modified form of air cleaner, the view being in section on a plane normal to the axis of the air cleaner.

Blower blade supporting arms 96 are socketed in the support 87 near the end of the support. As is indicated in the drawings, the arms 96 are air foil shaped in cross section so as to reduce the friction. Blades or vanes 97 are mounted upon the outer ends of the arms 96 and are curved as indicated in FIG. 13 to direct air outwardly toward the body sleeve 81. A particle discharge 99 is provided in the sleeve 81 outwardly of the vanes 97. Turbine blades 100 are supported by the other surface of the support 87 to extend outwardly tangentially to the support 87. These turbine blades 100 are driven by the swirling air entering the discharged sleeve 79, and act to rotate the blades 97 in a direction of rotation indicated by the arrow 101 in FIG. 13.

Figures 15, 16, 17:
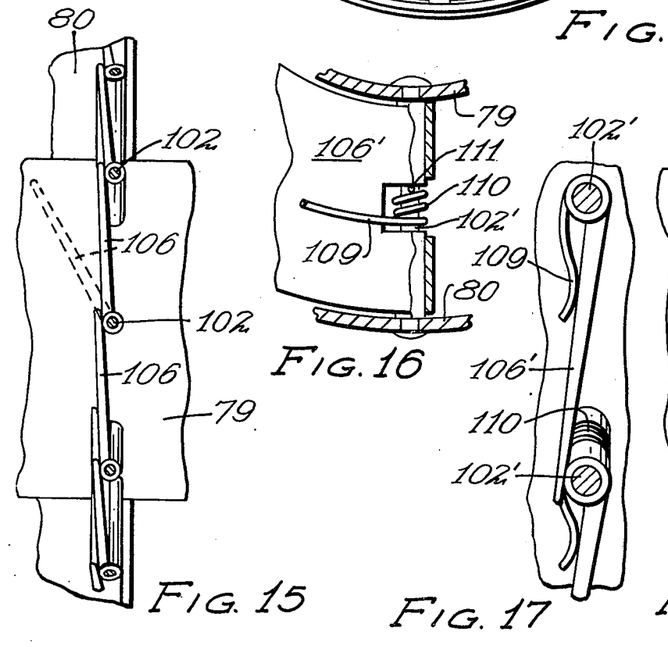
FIG. 15 is a detailed section inside the outer wall of the housing, showing the vanes supported on axes in a plane normal to the axis of the air cleaner.
FIG. 16 is a sectional detail showing the manner in which the vanes shown in FIG. 15 are supported.
FIG. 17 is a sectional detail showing the vanes as being spring urged toward closed position.
Figure 18:
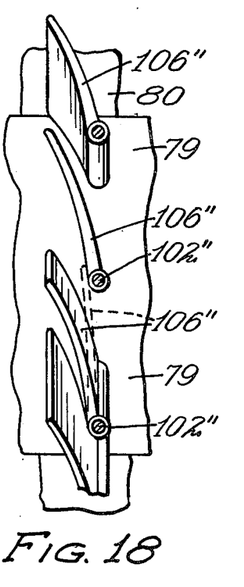
FIG. 18 is a view similar to FIG. 15 but showing vanes which are flexible and made of materials which are plastic or thin metal.

The sleeve 80 is supported by the sleeve 79 by a series of radially extending rivets or bolts 102. The rivets 102 are anchored to the sleeve 79 as indicated at 103, and are anchored to the sleeve 80 indicated at 104. The rivets 102 support the open end 105 of the sleeve 80 in concentric relation to sleeve 79 and serve as a support for vanes 106. The vanes 106 are provided with tubular ends 107 indicated in FIG. 12 encircling the rivets 102 and may be flat as indicated in FIGS. 15, 16 and 17 of the drawings, may be curved as indicated in FIG. 18 of the drawings, or may be flexible as indicated in FIG. 18, so as to flex into open position depending upon the velocity of air entering the air cleaner. In either event, the length or distance between ends of the vanes 106 is sufficient to produce an overlapping of their ends to effect a substantial closing when the suction in the outlet 11 is sufficient.

FIG. 15 of the drawings indicates blades or vanes 106 which are flat and which may be supported on the rivets or bolts 102 in such a manner that they may be a opened as indicated in dotted outline in FIG. 15, and which may be pre-set to provide a fixed opening so as to provide the necessary air for operating a constant speed motor, or for providing the necessary air to operate a governor-controlled internal combustion engine. While FIG. 15 shows the blades in full lines in closed position, it will be understood that the blades or vanes 106 are either adjustable in position to provide an air inlet, or else are formed of resilient material so as to flex open by the suction of air passing through the cleaner. When the vanes are rigid, and are frictionally adjustable, the supporting pivots 102 are preferably in the form of bolts so that the adjusted position of the vanes may be secured by tightening these bolts. When the vanes 106 are resilient, only one end, of course, is anchored, the other end being free to move. In both instances, the distance between the two ends of each vane 106 is sufficient so that the vanes 106 can flex closed due to a sufficient decrease in suction in the outlet 11. When the vanes 106 themselves are of resilient material, the inherent resiliency is such that their free ends will flex away from the fixed or anchored ends to such an extent that the inlet 19 opens to admit the required amount of air in accordance with the increased suction.

FIGS. 16 and 17 show blades or vanes 106' mounted upon pivots 102' so as to be rotatable relative to the pivots. Springs 109 are designed to bear against the vanes 106' and include a helical portion 110 having one end anchored to the pivots 102' as indicated at 111. The springs 109 normally urge the vanes 106' toward closed position, but the suction of air entering the air cleaner will swing the blades 106' open to the desired extent to allow the desired quantity of air to enter the cleaner. As a result, the vanes open when suction from the engine creates a minus pressure within the air cleaner body. As can be discerned from FIG. 17, the length of each vane 106' is sufficient to effect a closing when biased by the springs 109, which occurs when an insufficient suction or minus pressure exists within the air cleaner body or outlet 11.

FIG. 18 shows a modified form of construction in which the vanes 106" are fixedly supported upon the rivets 102", and vanes 106" being formed of resilient material such as plastic or rubber-like material. Normally the vanes 106" overlap one another and are in closed position as indicated in dotted outline in FIG. 18. The suction effect created by the motor will flex the blades or vanes 106" inwardly in a manner to permit air to enter the air cleaner.

The vanes 106, 106' and 106" function similarly to the air cleaner A which has been described. When the engine is started, a suction or partial vacuum is created within the body of the air cleaner which must be replenished by entering air. If the vanes are rigid, they must be pre-set and positioned to provide a desired air inlet. If the fixed vanes are not pre-set in position, they must be swung toward open position against the resisting pressure of resilient means such as the springs 110. Preferably, the vanes 106, 106', 106" are flexible and resilient (or at least resiliently mounted at one end), the suction created within the air cleaner then swinging the vanes into partially opened position so that air will enter the air cleaner to the necessary extent to supply a proper amount of air to supply the engine.

In any event, the inlet of the air cleaner is either open, or swings open in the manner described in the previous description. The velocity of the air entering the cleaner determines the extent to which the vanes will open, if they are resiliently closed as is preferable.

As the air enters the air cleaner, it is directed in a swirling direction by the vanes 106. This creates a centrifugal force in the entering air tending to throw the particles of foreign material entrained in the air outwardly toward the shell of the air cleaner. Centrifugal force is assisted by the blower blades 97 which aid in throwing the particle-laden air toward the outer shell 81 of the air cleaner.

The operation is similar to that previously described. The air passing through the air cleaner is changed in direction. Thus, the air moving in one axial direction is suddenly changed in direction so as to move in a reverse direction toward the outlet. The still swirling air moves toward the air outlet. Because of the fact that the area of the inlet portion of the air cleaner outwardly of the discharge sleeve 79 is greater than the area transversely of the discharge or outlet sleeve 11, the speed of the swirling air increases as it enters the discharge sleeve 11. Thus, the increased speed of the swirling air is directed against the turbine blades 100 and the blower blades 97 are rotated at a speed greater than the speed of the incoming swirling air. This action causes the blower blades 97 to fling the air outwardly so that the particles entrained in the incoming air are thrown against the blower shell 81 and the particles of dust and the like leave the air cleaner through the particle outlet 99 together with a portion of the entering air. As a result, the foreign particles are discharged from the air cleaner and separated from the air passing through the air cleaner inlet.

It will be understood that a considerable quantity of air passes through the air cleaner, particularly when the air cleaner is designed to clean air being directed to a high powered engine such as is used on earth moving equipment or the like. Air being supplied to engines of this type bear a considerable quantity of foreign particles due to the environment in which they operate. Air cleaners which are designed to screen out the foreign particles are quickly filled up with foreign materials, and the screens, which may be of one type or another quickly fill up with such particles and tend to obstruct the passage of air. Thus, if not replaced at short intervals they do not function properly and affect the operation of the engine. Air cleaners of the present type operate by centrifugal force, and there is nothing to block the supply of air entering the engine. Air cleaners of this type need not be replaced, effecting a saving over air cleaners of other types. Accordingly, such air cleaners are superior to air cleaners of previous types which include screens or filters which require constant replacement.

In many installations my cleaner is employed as a precleaner ahead of the usual or customary regular cleaner in order to prevent for all intents and purposes the clogging of the existing cleaner.

I claim:

1. An air cleaner including concentric first, second and third cylindrical sleeve means, said first sleeve means providing an outlet and said second sleeve means having a larger diameter than said first sleeve means and having flange means so as to provide a ring-shaped inlet therebetween and said third sleeve means having substantially the same diameter as said second sleeve means and providing an axial extension of said second sleeve means, the end of said third sleeve means remote from said second sleeve means being closed, the cross sectional area of said first sleeve means being less than the cross sectional area between said first and second sleeve means whereby air passing between said first and second sleeve means and through said third sleeve means will travel at a lower linear speed than air passing through the outlet formed by said first sleeve means, means adjacent said inlet for imparting a swirling motion of air entering said inlet and for controlling the linear speed of air through said inlet including a series of angularly spaced vanes, means resiliently mounting each of said vanes at only one end for normally urging the opposite end thereof toward the said one end of the next vane adjacent thereto, the distance between said one end and said other end of each vane being generally sufficient so that said vanes can flex substantially closed when the suction in the outlet decreases sufficiently and to flex open to admit air required as the suction in the outlet increases, a plurality of radially extending arms having blower blades supported at the outer ends thereof, means rotatably mounting said blower arms within said third sleeve means so that said blades are nearer said third sleeve means and generally in the path of air flowing from said second sleeve means, said blades being coaxially arranged with respect to said third sleeve means, a plurality of radially directed turbine blades on said means which rotatably mounts said blower arms, said turbine blades being located radially inwardly of said blower blades nearer said first sleeve means whereby air entering said first sleeve means engages said turbine blades to help rotate said blower blades in a manner to increase the centrifugal force of particles entrained in the air outwardly in the direction of said third sleeve means, said third sleeve means having a discharge opening through which said particles may pass.

2. An air cleaner including concentric first, second and third cylindrical sleeve means, said first sleeve means providing an outlet and said second sleeve means having a larger diameter than said first sleeve means and having flange means so as to provide a ring-shaped inlet therebetween and said third sleeve means having substantially the same diameter as said second sleeve means and providing an axial extension of said second sleeve means, the end of said third sleeve means remote from said second sleeve means being closed, the cross sectional area of said first sleeve means being less than the cross sectional area between said first and second sleeve means whereby air passing between said first and second sleeve means and through said third sleeve means will travel at a lower linear speed than air passing through the outlet formed by said first sleeve means, variable means adjacent said inlet for imparting a swirling motion to air entering said inlet including a series of angularly spaced vanes, deflector means adjoining said inlet normally biased toward a position partially closing said inlet for controlling the linear speed of air through said inlet, a plurality of radially extending arms having blower blades supported at the outer ends thereof, means rotatably mounting said blower arms within said third sleeve means so that said blades are nearer said third sleeve means and generally in the path of air flowing from said second sleeve means, said blades being coaxially arranged with respect to said third sleeve means, a plurality of radially directed turbine blades on said means which rotatably mounts said blower arms, said turbine blades being located radially inwardly of said blower blades nearer said first sleeve means whereby air entering said first sleeve means engages said turbine blades to help rotate said blower blades in a manner to increase the centrifugal force of particles entrained in the air outwardly in the direction of said third sleeve means, said third sleeve means having a discharge opening through which said particles may pass.

3. The air cleaner of claim 2 and in which said deflector means is resiliently supported.

4. The air cleaner of claim 2 and in which said deflector means is adjustably supported.

5. The air cleaner of claim 2 and in which said deflector means comprises a ring-shaped means encircling said first sleeve means forming said outlet.

6. The air cleaner of claim 5 and in which said deflector means is weighted to resist the force of incoming air.

7. The structure of claim 2 and in which said deflector means is supported to guide air toward said angularly spaced vanes.

8. The air cleaner of claim 2 in which both sides of said vanes are supported on a single cylindrical plane coaxial with said respective sleeve means.

9. The structure of claim 2 and in which said means which rotatably supports said blower arms includes an axially supported bearing post, means supporting said bearing post in fixed relation to said first sleeve means, a blower blade support encircling said post and rotatably supporting said blades.

* * * * *